United States Patent [19]

Nakamoto

[11] 4,092,570
[45] May 30, 1978

[54] SEQUENTIAL CONTROL DEVICE

[76] Inventor: Yutaka Nakamoto, 1556-31, Oaza-Kasuga, Kasuga-shi, Fukuoka, Japan

[21] Appl. No.: 659,191

[22] Filed: Feb. 19, 1976

[30] Foreign Application Priority Data

May 14, 1975 Japan .................................. 50-58249

[51] Int. Cl.² ....................... G05B 22/02; G05B 11/01
[52] U.S. Cl. ...................................... 318/102; 328/75; 364/104; 174/68.5; 361/166
[58] Field of Search .................. 328/75, 130; 317/139; 307/115, 116; 235/151.1; 318/102

[56] References Cited

U.S. PATENT DOCUMENTS

| 2,902,707 | 9/1959 | Bearer, Jr. | 317/139 X |
| 3,377,517 | 4/1968 | Hurley | 317/139 X |
| 3,521,130 | 7/1970 | Davis et al. | 317/139 |

FOREIGN PATENT DOCUMENTS

| 202,484 | 2/1955 | Australia | 318/102 |

OTHER PUBLICATIONS

"Sequence Control for Batch Polymerization" in Control Engineering, pp. 96–100, Sep. 1968.

Primary Examiner—Eugene G. Botz
Attorney, Agent, or Firm—Frank J. Jordan

[57] ABSTRACT

An electric device comprises a master control unit and a plurality of drive units for automatically controlling actuating devices respectively, in series in a plant assembly or process line by simple manipulation of the master control unit. The master control and drive units are similar and interchangeable in basic circuitry for mass production and quick assembly with one another.

11 Claims, 26 Drawing Figures

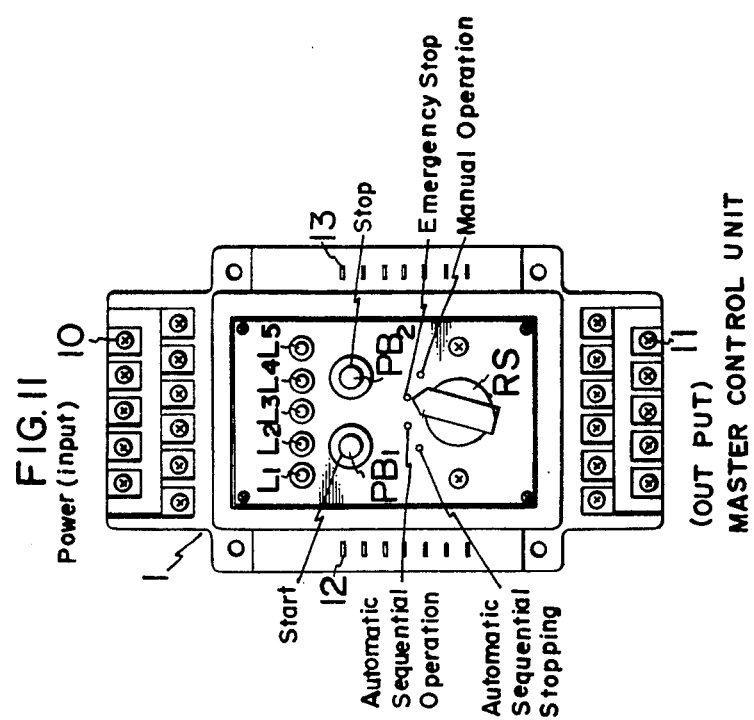
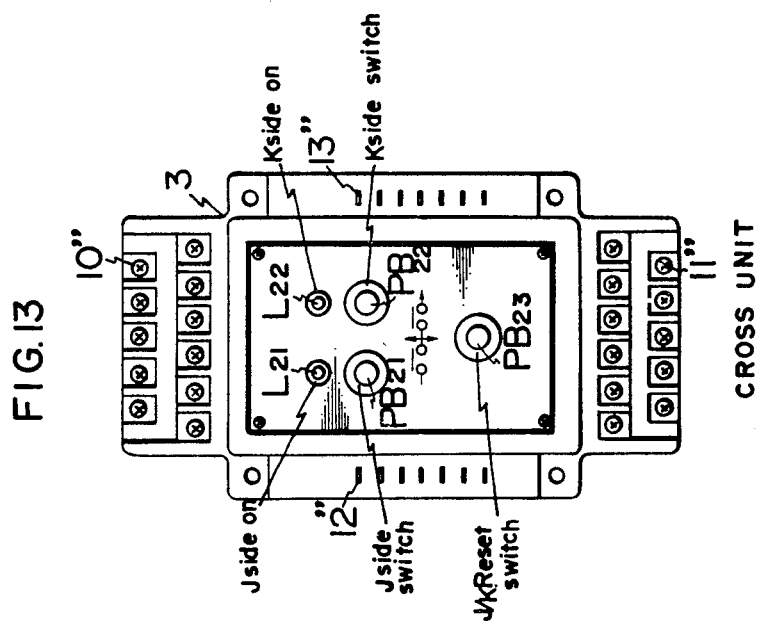

Sequential Control Input →  ← Sequential Control Output

DRIVE UNIT

SEQUENTIAL CONTROL DEVICE

BACKGROUND OF THE INVENTION

This invention relates to sequential control devices for efficiently controlling a process or manufacturing line of a plant of any kind.

In controlling the route or operation of a manufacturing line or a transferring conveyor line which employs a plurality of electric actuating devices such as electric motors or an equal number of electric actuating devices, wherein the operation, stop and resting of each motor is to be properly controlled or operated in a complicated sequence, which uses contact relays, non-contact relays or micro-computors, heretofore the wiring between relays had to be installed by hand on the site, and the relays had to be attached to the machines and operated after the wiring had been carefully checked.

The following are some of the problems which afflict such a prior art arrangement:

(1) Drawings or sequence design schemes become complicated and greatly increase in number thereby consuming a great amount of time and labor.

(2) Installation of prior control circuits cannot be achieved by the appointed date of delivery. Many difficulties arise after installation since the sequence design and wiring cannot be thoroughly checked due to the complexity and limited time period for installation.

(3) Furthermore, since a great number of relays and complicated wiring are employed in the sequence, maintenance and remodelling of the sequence becomes extremely difficult, and the control itself becomes large in size. A professional engineer who is well versed in the sequence control is required for daily maintenance, in addition to making repairs.

The following conditions must be satisfied to resolve the above mentioned disadvantages of conventional sequence design and the sequence controls which use such design:

(1) All necessary electrical connections to control one electric actuating device should be assembled and incorporated into one unit.

(2) Each unit must function to control the transmission of separate regulating signals both to the immediately preceding unit and to the immediately succeeding unit.

(3) Each unit must be standardized and equalized so that one unit is interchangable with another unit.

(4) A connector must be used in connecting two adjacent units so that wiring at the installation site is minimized.

(5) An indication of the kind of operation in progress, such as normal operation, the occurrence of the trouble and so on, should be effected within each unit, so that even a layman can judge whether an electric actuating device is operating normally or is out of order.

(6) In the drawing of the sequence, the control circuit within the electric actuating device, such as a motor, must be created as a separate unit so that details of the circuit can be omitted.

It is an object of the present invention to provide a sequential control device which comprises a master control unit and a plurality of drive units applicable to the control of a plurality of electric motors in series in production or manufacturing lines which satisfies the above mentioned operational conditions.

It is another object of the present invention to provide a sequential control device which comprises a master control unit, drive units and cross units applicable to the control of a complicated production or manufacturing line which comprises at least two production lines in which a plurality of electric actuating devices are arranged in series in each line. Due to the employment of the cross units in the desired positions of the entire device, several process routes can be created, whereby the entire production line can achieve flexibility in the processing or manufacturing of products.

A further object is to provide prewired control, drive, and transfer units that can be mass-produced for use in plant lines of production by simply connecting any required number to one another and to the electrically controlled drives of the lines, to form a sequential device for the motors of such lines.

BRIEF DESCRIPTION OF THE DRAWINGS

FIG. 11 is a view in front elevation of a master control unit of the invention.

FIG. 13 is a similar view of a cross unit.

DETAILED DESCRIPTION OF THE DISCLOSURE

Figure 1:
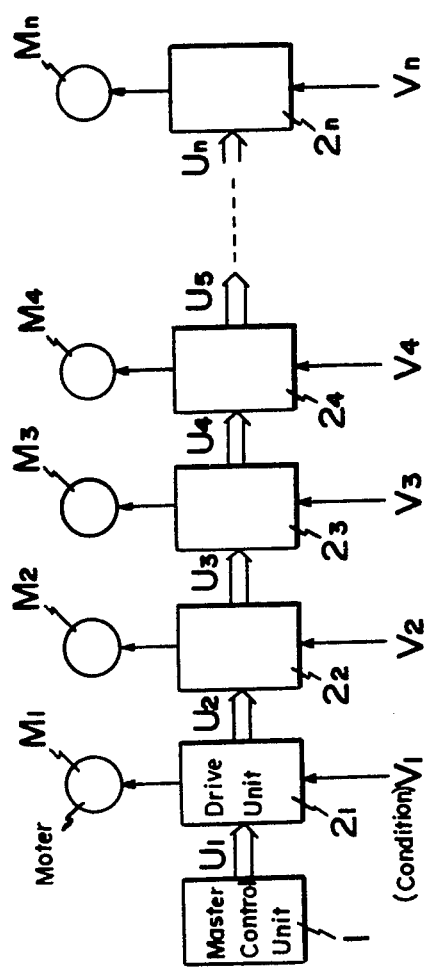
FIG. 1 is a block diagram which shows the principle concept of the operation of the sequential control device of the present invention as it is applied to a single production line.
Figure 2:
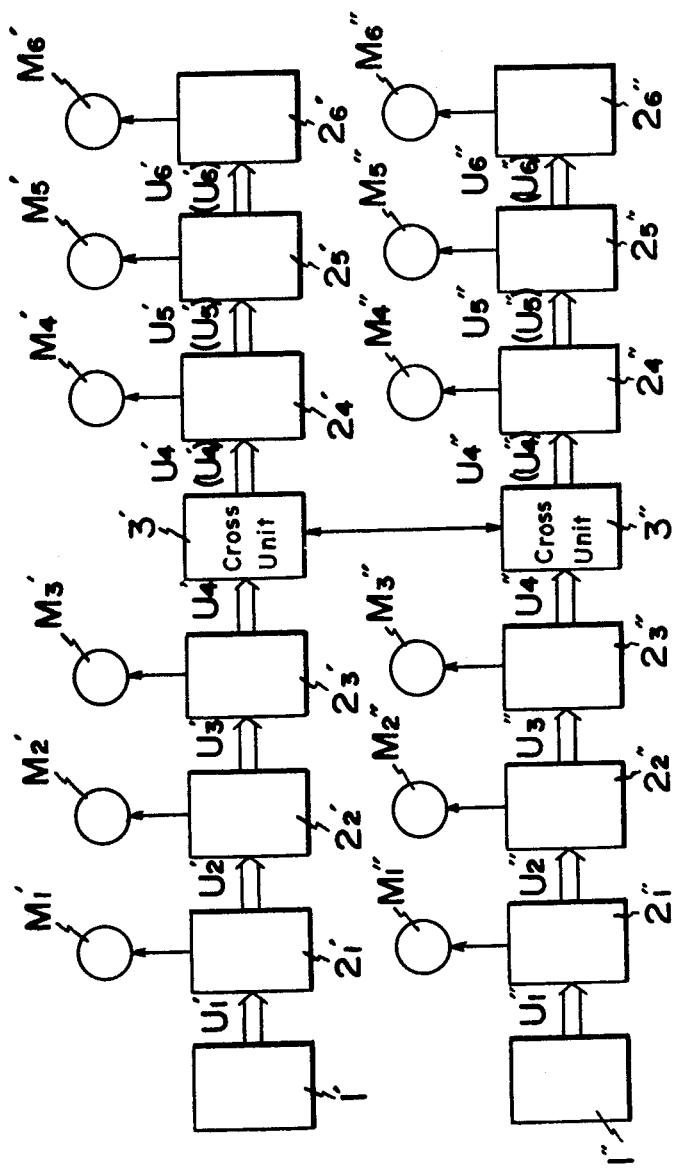
FIG. 2 is a block diagram of a modification of the invention as it is applied to two different but related production lines.

The construction and arrangement of the principle block diagram of the sequential control of the present invention is first described in conjunction with FIG. 1 and FIG. 2.

When a plurality (n) of the electric actuating devices, such as motors $M_1 M_2 \ldots M_n$, FIG. 1, are employed in a production line, the same number (n) of forward step drive units 2 are employed. Each drive unit 2 switches on and off the main circuit of the corresponding electric motor $M_1$ wherein a condition for switching on and off is transmitted in turn to each successive drive unit $2_1$, $2_2$ --- $2_n$ as drive condition $V_1$, $V_2$ --- $V_n$.

The drive unit $2_1$ which receives the sequential control input $U_1$, i.e., the sequential operation input from master control unit 1 is activated to drive the motor $M_1$, provided other conditions $V_1$ inside the control unit 1 are satisfied. Subsequently, the sequential control input $U_2$ from the operation of a timer in control unit 1 is transmitted to the forward-step drive unit $2_2$. In this manner the sequential control input U is transferred from one unit to the next unit in series, and finally to the last drive unit $2_n$, whereby all of the motors M are put in normal operation.

FIG. 2 shows two production lines wherein several routes are possible, such as:

(I) $1' \to 2_1' \to 2_2' \to 2_3' \to 2_4' \to 2_5' \to 2_6'$
(II) $1'' \to 2_1'' \to 2_2'' \to 2_3'' \to 2_4'' \to 2_5'' \to 2_6''$
(III) $1' \to 2_1' \to 2_2' \to 2_3' \to 2_4'' \to 2_5'' \to 2_6''$
(IV) $1'' \to 2_1'' \to 2_2'' \to 2_3'' \to 2_4' \to 2_5' \to 2_6'$

Conventionally with respect to the changing of the normal routes I or II, to routes III or IV, the above changing operation has inevitably necessitated complicated changes in the wiring circuits.

In the present invention, as shown in FIG. 2, cross units 3' and 3" are employed at the junctions wherein the upper input $U_4'$ is transferred to the lower drive unit $2_4''$ by way of cross units 3' and 3", while the lower input $U_4''$ is transferred to the upper drive unit $2_4'$ by way of cross units 3' and 3". The cross units which are extremely effective in simplifying the sequential control such as that mentioned above also form part of this invention.

In FIG. 2, the number of the drive units is shown as six in each production line. However, it can be easily understood by those skilled in the art that any desired number (n) of drive units 2' may be used with a corresponding number of motors or other electric actuating devices M.

Figure 12:
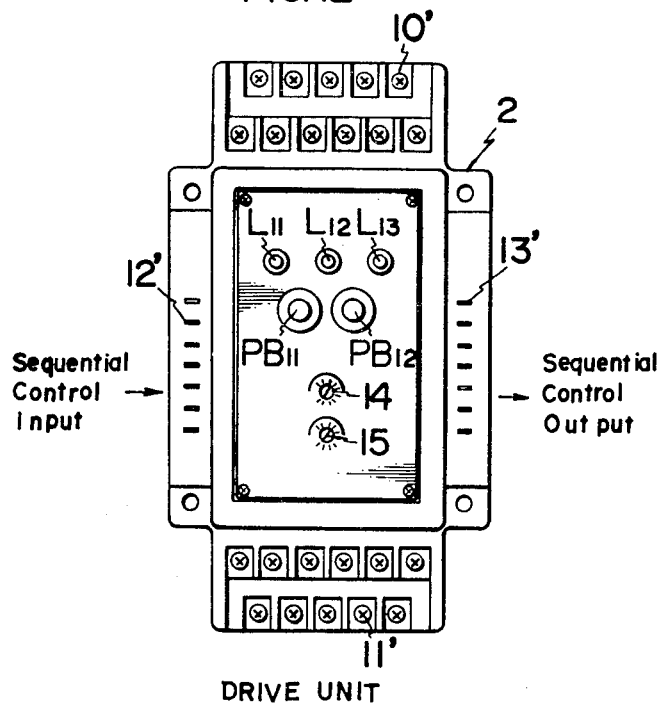
FIG. 12 is a similar view of a drive unit.

Practical embodiments of the master control unit 1, the drive unit 2, and the cross unit 3 of the sequential control of this invention are shown in FIG. 11, FIG. 12, and FIG. 13, respectively. FIG. 11 shows the master control unit 1 in which automatic sequential operation input, automatic sequential stopping input, emergency stop input, and manual operation input are transmitted to all drive units by the manipulation of a rotary switch RS at the front of the unit 1. This unit 1 also comprises two push buttons $PB_1$ and $PB_2$. Manipulation of the push buttons $PB_1$ and $PB_2$, respectively, cause starting of the entire sequential control, as well as emergency stopping thereof.

Five indicating lamps $L_1$, $L_2$, $L_3$, $L_4$, and $L_5$ are also provided on the front surface thereof. Lamp $L_1$ when lit indicates that direct current (voltage) is supplied to the respective units; and indicating lamp $L_2$, when lit, assures that the operation has started. Indicating lamp $L_3$ when lit assures that the entire routes are correctly connected and trouble-free. Lamp $L_4$ indicates that all individual circuits are completely connected electrically without any trouble; and lamp $L_5$ indicates that the circuit has been broken. In FIG. 11, numerals 10 and 11 are input and output terminals of the master control unit 1. Some input terminals 10 are connected to an outside power source, while the output terminals are not employed in the embodiment of this invention.

FIG. 12 shows the drive unit 2 which is provided with a variable-resister type tuning knob 14 for adjusting the period of time of an ON timer $T_{ON}$ and another variable-resister type tuning knob 15 for adjusting the period of time of an OFF timer $T_{OF}$.

Furthermore, on the front of the unit 2, two push buttons $PB_{11}$ and $PB_{12}$ are provided whereby, during manual operation, manipulation of $PB_{11}$ and $PB_{12}$, respectively, switches the unit 2 on or off. Three indicating lamps $L_{11}$, $L_{12}$ and $L_{13}$ are also provided on the front thereof, wherein lamp $L_{11}$, when lit, assures that the operation input is supplied to the circuit. Indicating lamp $L_{12}$ shows when the inhibition input, which stops the operation of the unit 2 when mechanical mishaps occur, is being exerted. Indicating lamp $L_{13}$ shows that the electric actuating device such as the motor M is being driven in a normal manner.

In FIG. 12, input and output terminals 10' and 11' are connected, respectively, to the terminals of the corresponding electric actuating devices M. Sequential control input and output terminals 12' and 13' are connected to the output and input terminals, respectively, of the preceding and forward units 2.

FIG. 13 shows the cross unit 3 having two indicating lamps $L_{21}$ and $L_{22}$ and three push buttons $PB_{21}$, $PB_{22}$, and $PB_{23}$. Indicating lamp $L_{21}$ shows that the J side of the cross unit 3 is switched on, and indicating lamp $L_{22}$ shows that the K side of the cross unit is switched on. Manipulation of the push bottons $PB_{21}$ and $PB_{22}$, respectively, cause the activation of the J side circuit and of the K side circuit of the cross unit 3. Push button $PB_{23}$ is employed for the purpose of resetting the J and K sides of the cross unit 3. A plurality of input and output terminals 10" and 11" are connected to the appropriate terminals of other cross units. Input and output terminals 12" and 13" are connected to the corresponding output and input terminals of adjacent drive units 2.

FIRST EMBODIMENT

The sequential control of the first embodiment of this invention is hereinafter disclosed in greater detail.

As pointed out above such embodiment provides a sequential control device, FIG. 1, comprising a plurality of drive units 2 and a master control unit 1 which are connected in sequence, wherein each unit controls one of a plurality of electric motors M which are arranged in sequence in the manufacturing production line.

Figure 3:
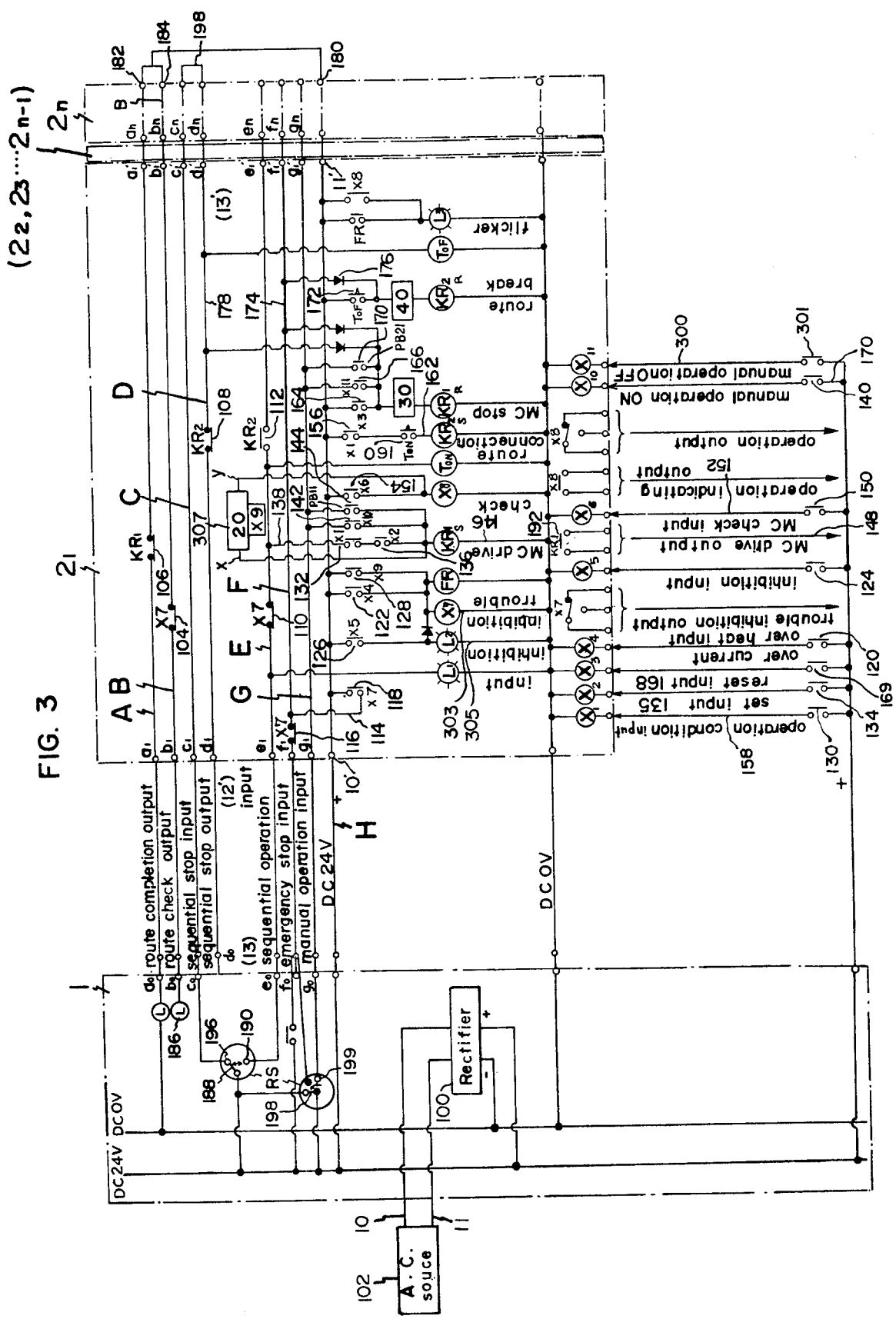
FIG. 3 is an electric circuit diagram of the sequential control device of the embodiment of FIG. 1.
Figure 4:
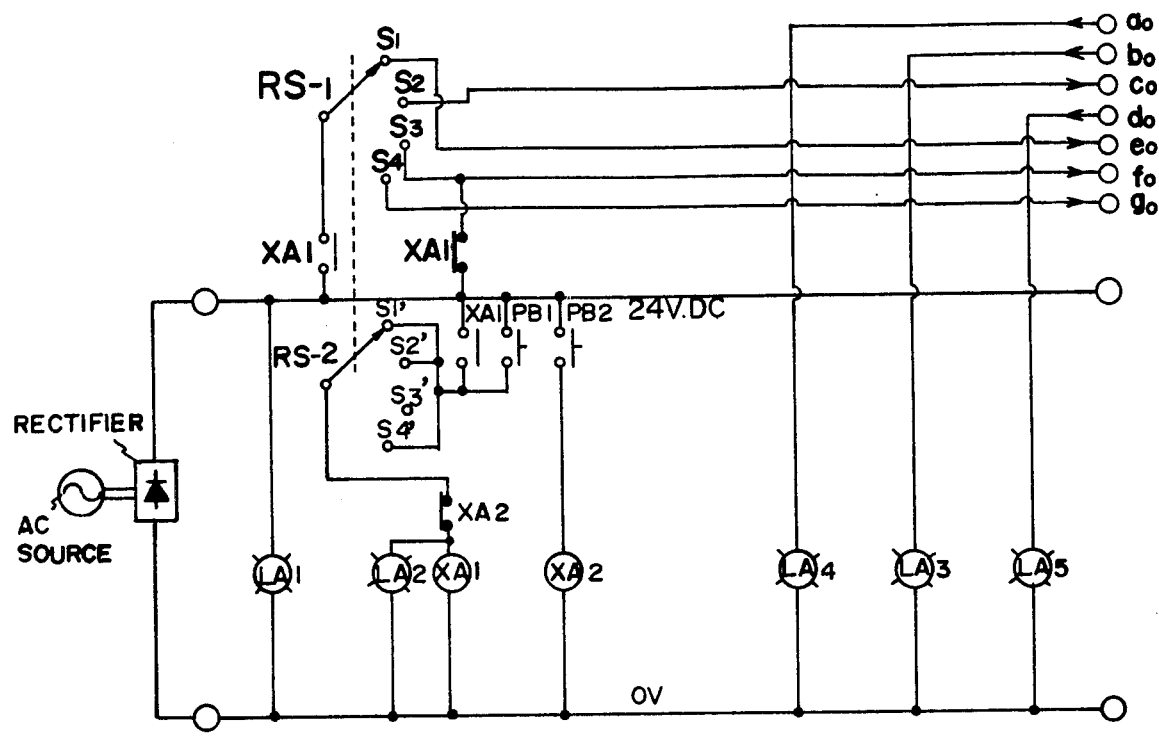
FIG. 4 is a circuit diagram of the master control unit.
Figure 5:
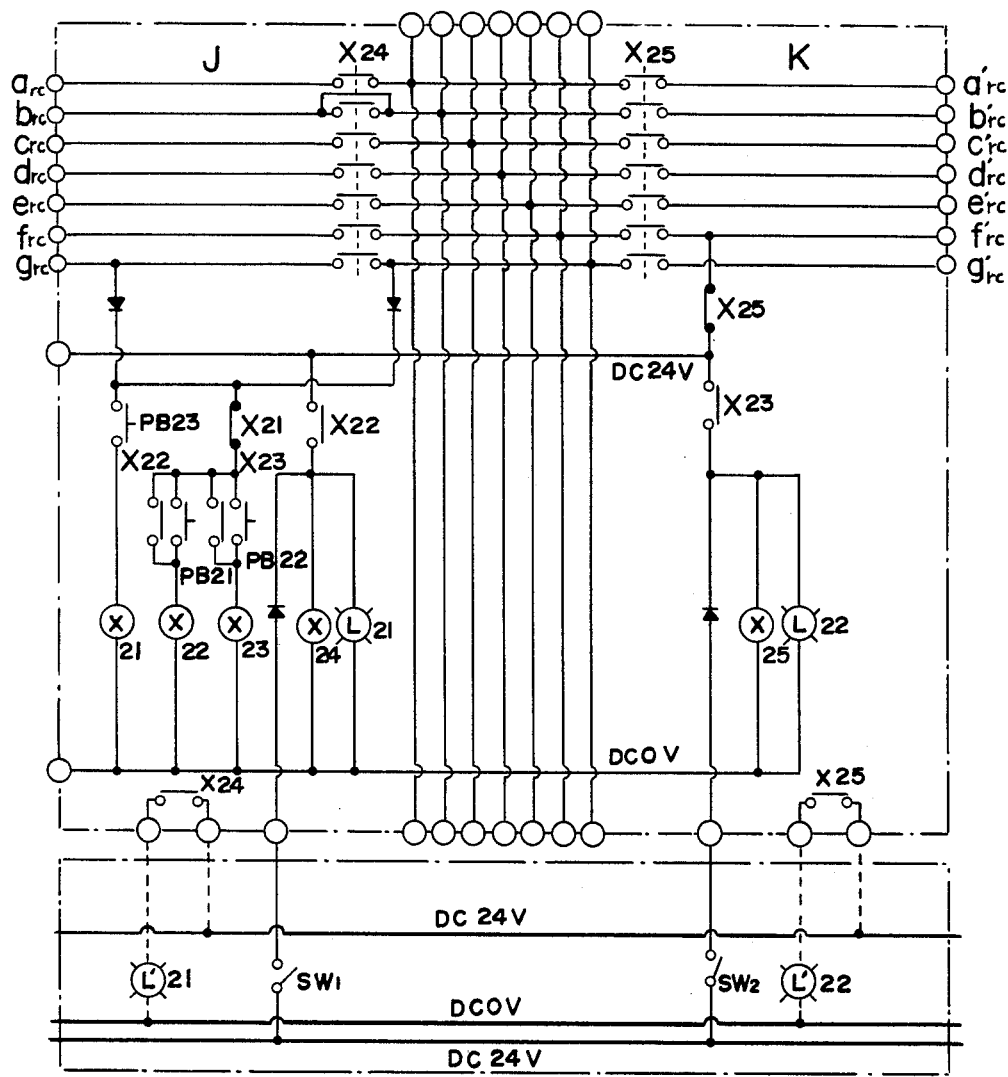
FIG. 5 is a circuit diagram of the cross unit.
Figure 6:
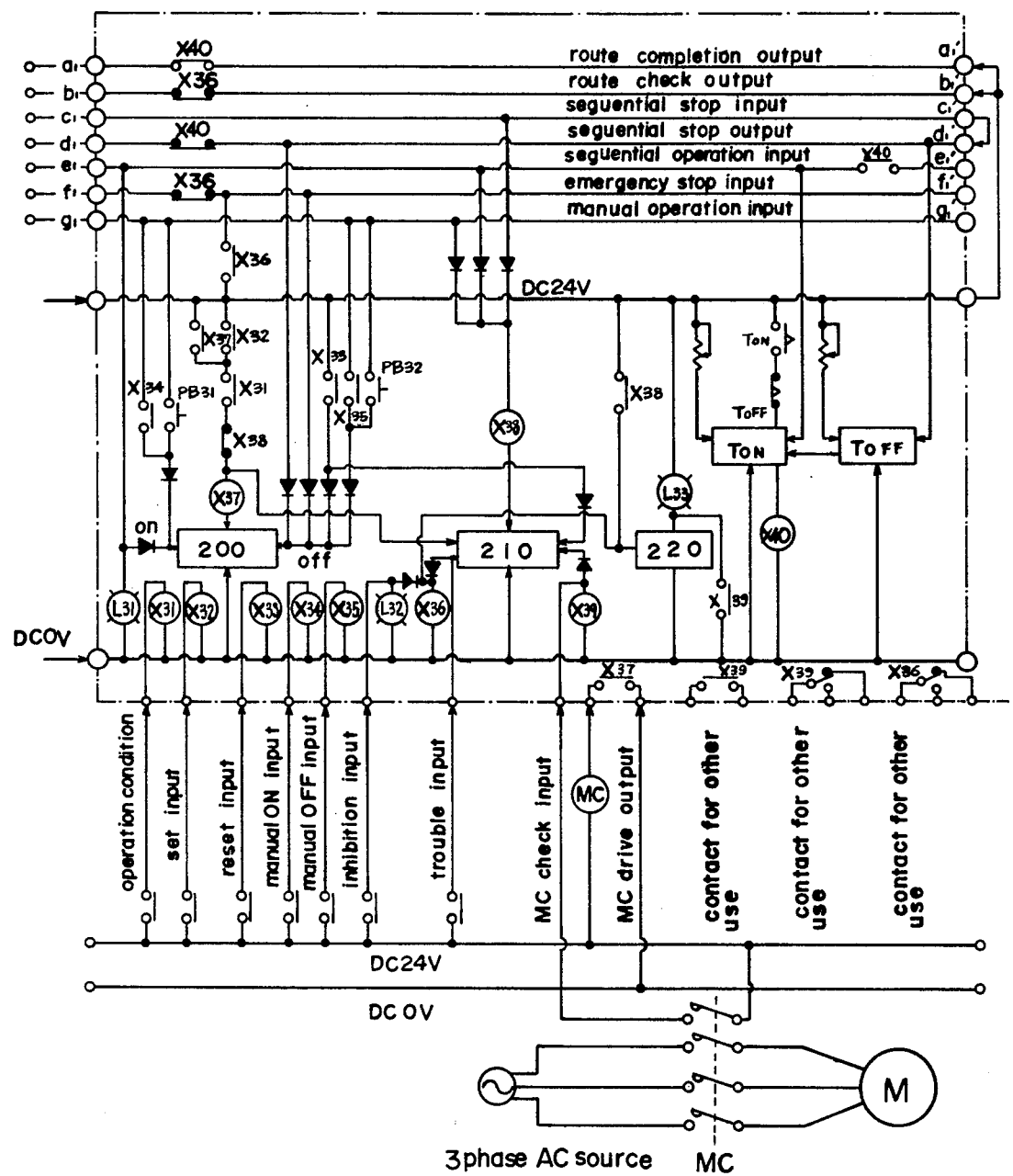
FIG. 6 is a circuit diagram of the drive unit.
Figure 7A:
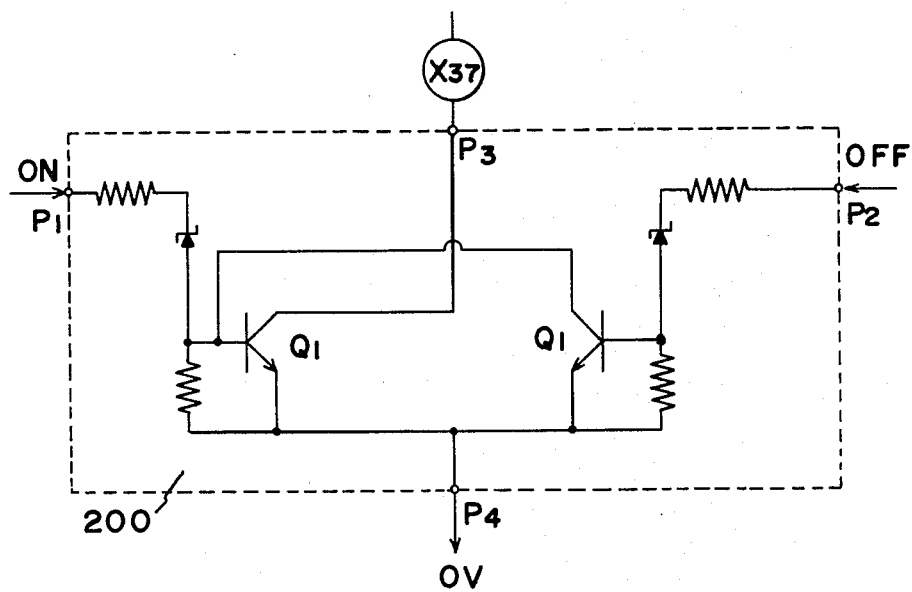
FIGS. 7a and 7b are circuit diagrams of the (electromagnetic coil) drive circuit, and the trouble detecting circuit, respectively.
Figure 7B:
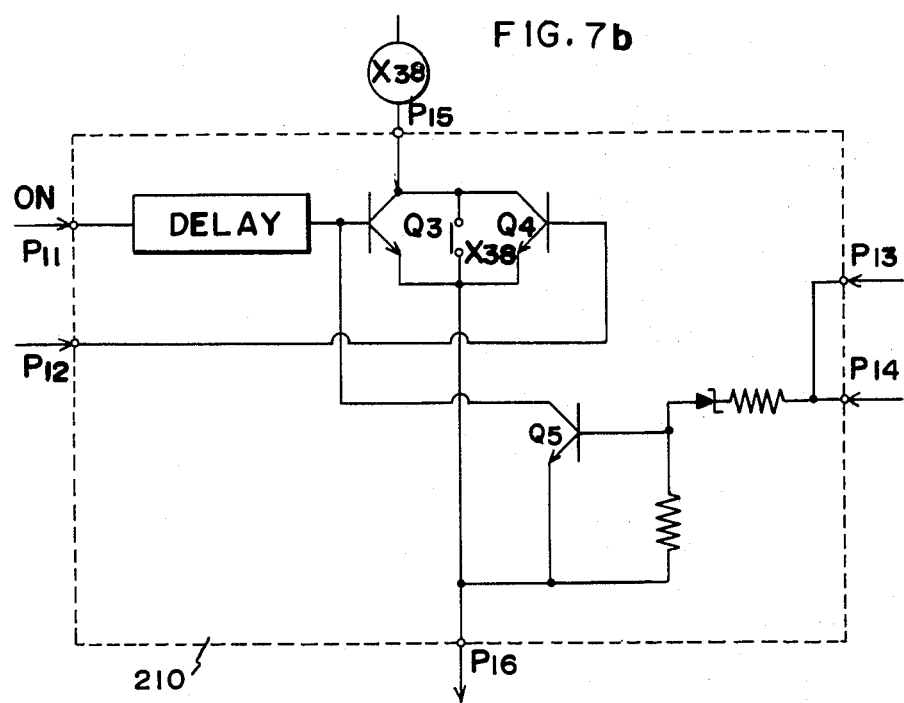

The construction of the device of this embodiment is explained in conjunction with the practical sequential circuit shown in FIG. 3. In FIG. 3, numeral 1 indicates the master control unit which includes a rectifier 100 which converts alternating current from an outside source 102 to direct current of 24V (potential) which is used for energizing the sequential control device. Numerals $2_1$ --- $2_n$ indicate the drive units, which are arranged in series wherein the first drive unit $2_1$ is electrically connected to the master control unit 1. Each drive unit $2_1$, $2_2$ --- or $2_n$, respectively, controls a corresponding electric actuating device.

In FIG. 3, the drive unit 2, comprises a route completion circuit A, a route check circuit B, a sequential stop circuit which is composed of a transmitting circuit C and a return circuit D. A sequential operation circuit E, and emergency stop circuit F and a manual operation circuit G are also provided in each drive unit 2. These circuits are employed to conduct a sequential control signal which consists of a plurality of components: namely, a route completion output *a*, a route check output *b*, a sequential stop input *c*, sequential stop output *d*, a sequential operation input *e*, an emergency stop input *f* and a manual operation input *g*.

H indicates a power-supply line for transmitting the direct current of 24 V (potential) to the entire sequential control device of this embodiment.

A break contact 104 of a relay $X_7$ which is energized by the inhibition input or trouble input (which are explained in detail later) is located in the route-checking circuit B. A break contact 106 of a keep relay $KR_1(S)$ which is activated by the motor-drive output and is later described in detail, is located in the route completion circuit A. The sequential stop circuit consists of the transmitting circuit C and the return circuit D. No contact is inserted in the transmitting circuit C, but a contact 108 of a keep relay $KR_2$ (R) which is later described in detail, is inserted in the return circuit D. A break contact 110 of the above mentioned relay $X_7$ and a make contact 112 of the keep relay $KR_2(R)$ are located in series in the sequential operation circuit E.

An interlocking circuit 114 is provided comprising a break contact 116 of above relay $X_7$ in the emergency-stop circuit F. The circuit 114 bridges the emergency-stop circuit F and the power-supply line H, and includes a make contact 118 of the above relay $X_7$. In effect the break contact 116 and the bridging circuit are inserted in series in the emergency-stop circuit F. The manual operation circuit G is employed during manual operation instead of using automatic operation which employs the sequential operation circuit E and the sequential stop circuit C and D. An input terminal of each circuit of a unit 2 is connected in series with an output terminal of the corresponding circuit of the one-step preceding unit, while an output terminal of each circuit of the unit 2 is connected in series with an input terminal of a corresponding circuit of one-step forward unit.

Input terminals 12' of the first drive unit $2_1$ are connected to the output terminals 13 of the master control unit 1 which supplies the direct current of 24V (potential) to each circuit as required. The output terminals of the end unit $2_n$, the output terminals of route-check circuit B and of the route completion circuit A are supplied with voltage by the power source line H. The transmitting circuit C and return circuit D of the sequential stop circuit are short-circuited. The output terminals of sequential operation circuit E, the emergency stop circuit F and the manual operation circuit G are left open. The above mentioned circuitry is such that complete supervision of the sequential control device is available at the master control unit 1.

Remaining parts of the circuit of the sequential control device, especially those of the circuit of the drive unit 2 are described below in detail.

The relay $X_7$ is activated upon closure of the overcurrent input and over-heat input switch 120 caused by overloading of the motor M, FIG. 1, energizing relay $X_4$ to close the latter's switch 122. Relay $X_7$ is also activated by closure of inhibit input switch 124 which activates the relay $X_5$ closing switch 126; or closure of trouble input switch 128 when relay $X_9$ is activated. The closing coil $KR_1(S)$ of the keep relay $KR_1$ is activated either (1) when closure of operation condition switch 130, which activates relay $X_1$ closing switch 132 and closure of set input switch 134, which activates the relay $X_2$ by input signal closing switch 136 which are disposed in a series circuit 138 are both activated in automatic operation; or (2) when the manual operation input switch 140 which activates the relay $X_{10}$, closing switch 142, or (3) the pushbutton $PB_{11}$ switch 144, which is included in the unit 2, is activated during manual operation.

When the MC drive 146 output 148 (which is supplied to the motor) switches on the power switch for the motor so as to supply 3-phase alternating current of such motor for driving the motor, an auxiliary contact 150 which is connected in parallel to the power switch, is also switched on so that an MC check input 152 is generated, energizing relay $X_6$, closing switch 154.

Upon closure of switch 154, relay $X_8$ is activated. The closing coil $KR_2(S)$ of keep relay $KR_2$ is activated when the make contact 156 of the relay $X_1$, which is activated by the operation condition input 158 and closure of contact 160 of ON-timer relay $T_{ON}$, which are connected in series in circuit 162, are both closed.

The opening coil $KR_1(R)$ of keep relay $KR_1$ is activated at any time by the closing of make contact 164 of relay $X_3$, or the make contact 166 of relay $X_{11}$ which are activated by the reset input 168 incurred by the closing of switch 169 or manual operation $PB_{21}$ input switch 170, respectively. Such relay $KR_1$ is also activated by closure of push button $PB_2$ switch 170 which is included in the unit 2'.

The opening coil $KR_2(R)$ of the keep relay $KR_2$ is activated by the closure of switch 172 of OFF-timer $T_{OF}$, or the emergency-stop input 174 via diode 176, so that the sequential stop circuit 178 is again closed. Then the current is supplied to the sequential stop circuit 178 of the preceding unit. The trouble-detecting circuit 20 has one end connected to the keep relay $KR_1(S)$ and another end connected to the relay $X_8$ to check possible trouble within the motor as explained below.

The manner in which the sequential control device of FIG. 3 is operated is set forth below. First, before starting the electric motors, DC voltage is supplied to the power-source line H connecting terminals 10' and 11' of each unit. After the voltage reaches the terminal 180 of the end unit $2_n$, it is transferred to the output terminals 182, 184 of the route check circuit B of the end unit $2_n$, and returns to the input terminal $b_1$ of the route-check circuit B of the head unit $2_1$ by way of the normally closed contact 104 of relay $X_7$ of each unit, if no inhibition input, or trouble input, which if present activates the relay $X_7$ of each unit, exists in any of the entire group of units.

Since the input terminal $b_1$ of the route-check circuit B of the head unit $2_1$ is connected to a lamp 186 in the master control unit 1, the lamp serves as an indicator to check the connection of the entire route of the control device. If trouble exists in one unit, a voltage signal does not return to the terminal $b_o$ of the master control unit 1, so that an abnormal condition or trouble within the entire device is promplty and easily checked.

After such checking operation, the operator is required to choose or select either automatic operation, or manual operation, by setting the master control unit 1. In the case of automatic operation, when voltage is applied to the input terminal $e_o$ of the sequential operation circuit E by setting the rotary switch RS arm 188 on tap 190, the keep relay $KR_1(S)$ is activated inasmuch as the make contact 132 of the relay $X_1$ and the make contact 136 of the relay $X_2$ which are activated by the operation condition and set inputs 158 and 168, respectively, are closed; wherein the relay $X_7$ is not activated, and this implies that the device is working. Due to the energizing of the relay $KR_1(S)$, the make contact 192 thereof is closed, energizing the MC drive output 148, so that the motor is driven. Further, since the relay $X_6$ which is energized by the check input 152, which is caused in starting the motor, closes the make contact 154, and energizes the relay $X_8$, so that the trouble-detecting circuit 20 indicates that the motor is normally driven. The sequential operation input signal further activates the ON-timer $T_{ON}$ so that the make contact 160 of the time $T_{ON}$ is closed. Since the make contact 156 of relay $X_1$ is already closed at this stage of the operation, the keep relay $KR_2(S)$ is energized so that the make contact 112 is closed, whereby the sequential-operation signal is transferred to a one-step forward unit along the sequential-operation circuit E.

The route completion circuit A is employed to check to ensure that all of the motors are being normally driven. If the set input 168 which activates the relay $X_2$ is not introduced to one unit, the motor which corresponds to that unit is not driven, and the sequential-operation voltage is transferred to the one-step next forward unit from the unit irrespective of the stoppage of the motor. In the case of sequential stop operation of the control device, when the DC voltage is applied to the input terminal $c_o$ of the sequential stop circuit C by setting of the rotary swith RS arm 188 on tap 196 of the master control unit 1. Such voltage signal is transferred to the output terminal $c_n$ of the end unit 2M through transmitting circuit C, and passes through the short circuit 198 to the return circuit D of the sequential stop circuit, and thereby initiates the stopping operation from the end unit $2_n$.

Due to application of the sequential stop voltage, the closing coil $KR_1(R)$ of the keep relay $KR_1$ is energized so that the make contact 192 of the driving output circuit 148 of the motor, which is closed during the sequential operation, is again stopped whereby the motor ceases operating. Furthermore, due to the such sequential stop voltage, OFF-timer $T_{OF}$ is simultaneously activated, so that the make contact 172 of the timer $T_{OF}$ is closed. This energizes the keep relay $KR_2$ of the closing coil $KR_2(R)$ so that the break contact 112 of relay $KR_2$, which is open during the sequential operation, is now closed, whereby the sequential stop signal is transferred to the one-step next back unit in sequence and all the motors from the end unit $2_n$ back to the head unit $2_1$ cease operating.

In the case of manual operation, the rotary switch RS of the master control unit 1 is turned to switch from automatic operation to manual operation by setting arm 198 on tap 199. Manual operation input circuit G activates the relay $X_{10}$ contact 142 by closure of the push-button $PB_1$, switch 140, which is included in the drive unit 2. The motor which corresponds to the unit 2 thereupon starts without necessitating the activation of the ON-timer $T_{ON}$ which causes the sequential operation of the units. If the manual stop input 300 which activates the relay $X_{11}$ is activated by pressing the other push-button $PB_2$ switch 301, which is included in the unit is pressed, the motor stops its operation without necessitating activation of the OFF-timer $T_{OF}$. Emergency stop circuit F is employed for the purpose of stopping the operation of all the motors in the case of emergency irrespective of the condition of the operation, either automatic or manual.

The voltage signal is supplied to the units 2 in series from the master control unit 1 by the manipulation of the rotary switch RS on the master control unit 1.

Due to the voltage signal to the unit 2, the keep relay $KR_1(R)$ of each unit 2 is activated, so that all make contacts 192 of the relays $KR_1(R)$ are opened to stop MC drive output 148 to the respective motors, whereby the motors cease operating and simultaneously sequential operation is broken, since the make contact 192 of the keep relay $KR_2(R)$ is again opened due to activation of the relay $KR_2$. This emergency stop circuit F also includes the interlocking circuit 114 which works when trouble input 303 or an inhibition input 305 occurs in the unit 2.

When the inhibition or trouble input occurs, relay $X_7$ is activated, so that the break contact 116 which is in the emergency stop circuit F is opened, and simultaneously the make contact 118, which is in the interlocking circuit 114, is closed. In this way the trouble or inhibition input (signal) is transferred to the one-step next forward unit through the power supply line H, even when the break contact 116 on the emergency stop circuit F is opened, so that the motor of such unit and the motors of succeeding units are simultaneously stopped. With respect to the trouble-detecting circuit 20, the latter 20 comprises positive and negative terminals $x$ and $y$. In normal operation when the keep relay $KR_1(S)$ is energized to supply an operation signal to the corresponding motor, voltage is applied to the terminal $x$. When the relay $X_6$, which is energized by the MC check input 146, which in turn is caused in starting the motor, causes the make contact 154 to close, and thereby relay $X_8$ is energized, so that another voltage is applied to the terminal $y$ of the trouble-detecting circuit 20. If, by some chance the check input from the main circuit of the motor is not given to the input terminal $y$, due to the occurrence of trouble in the circuit, a relay $X_9$ which is included in the trouble-detecting circuit 20, is energized so that the make contact 128 of the relay $X_9$ is closed to energize the relay $X_7$, whereby the circuit operations necessary at the time of the occurrence of the trouble are consumated.

In normal operation of the trouble-detecting circuit 20, input voltage to terminal $y$ is supplied to the trouble-detecting circuit 20 a little later than that to terminal $x$, because the check input voltage on terminal $x$ is generated a little later than the voltage applied to terminal input $y$. For the purpose of prohibiting the operation which might take place at the time of the occurrence of the trouble in the unit within the such relatively short delayed time, delay circuit means 307 which delays the effective arrival time of the input voltage to terminal $x$ is disposed at the corresponding side of the trouble-detecting circuit 20.

According to this invention, the sequential control device comprises all of the functions required to conduct the sequential control of a plurality of electric motors which are used in production, or manufacturing lines, or transferring conveyor lines, wherein each motor has one control unit that indicates the operation which the motor effects. Furthermore, since all of the units are made with similar circuits and in size, the units are connected by convenient connector means, whereby the wiring of the complete device at the installation site is simple and can be completed quickly and easily. The units are identical and interchangable in use, greatly minimizing the cost of making them.

Figure 18:
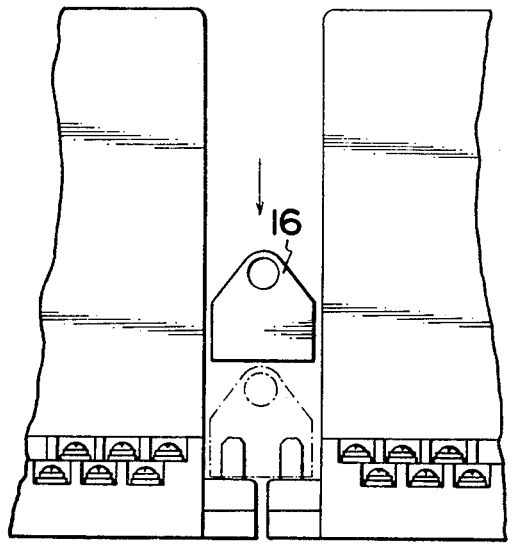
FIG. 18 is a schematic view showing the manner in which the connector is applied.
Figure 19:
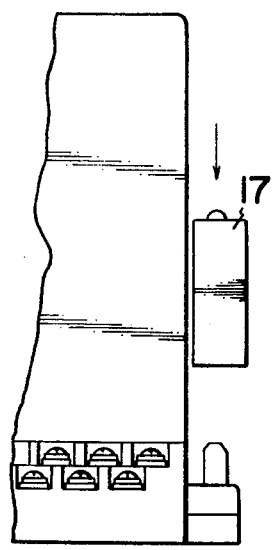
FIG. 19 is a schematic view showing the pin-type connecting terminal of the last stage unit.
Figure 14:
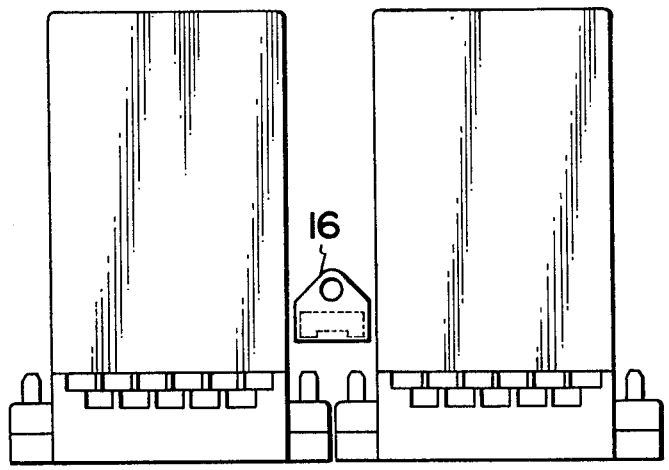
FIGS. 14A and 14B are the front and plan views respectively, of adjoining units and their connector, showing another example of the relationship between them.
Figure 14:
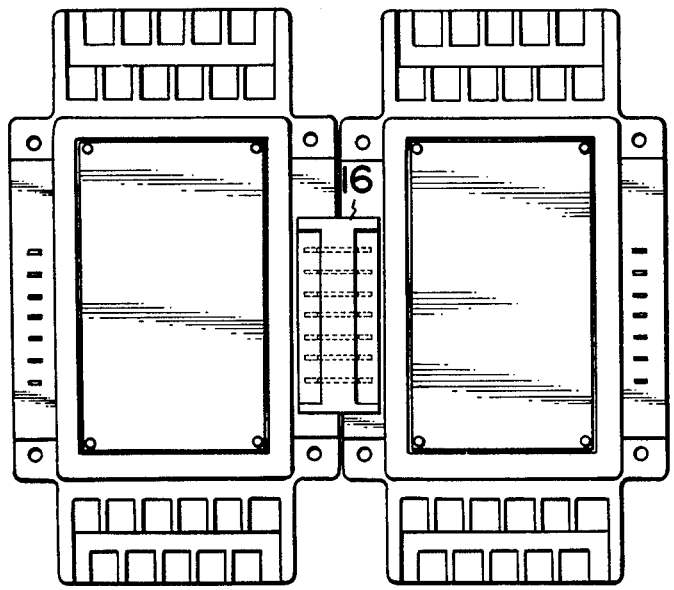
Figure 15:
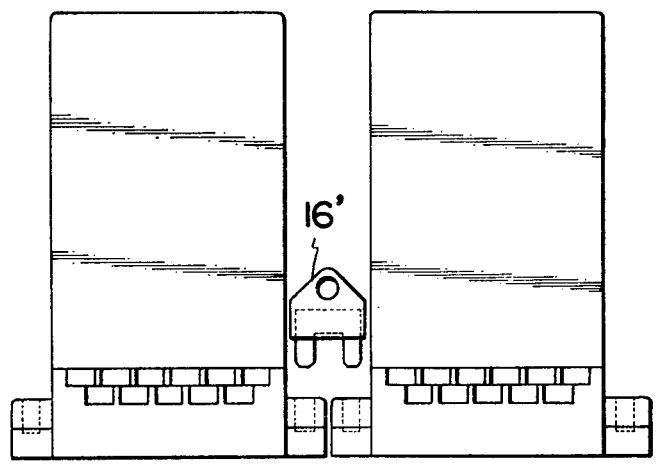
FIGS. 15A and 15B are the front and plan views, respectively, of adjoining units and the connector, showing still another example of the connective relationship therebetween.
Figure 15:
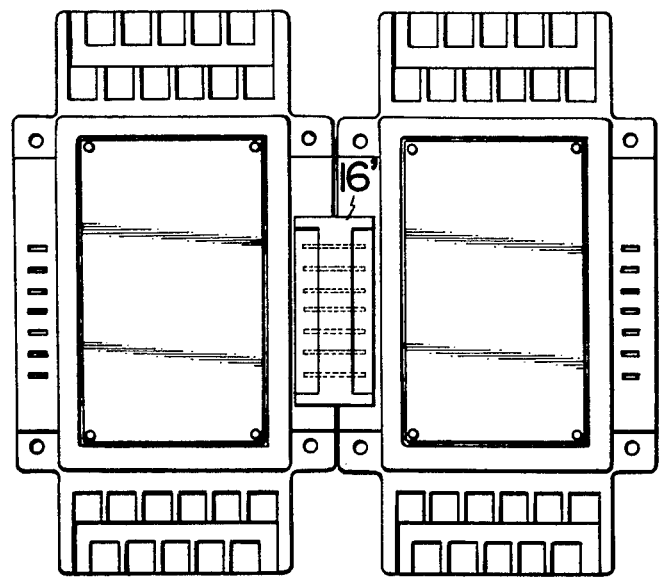
Figure 16:
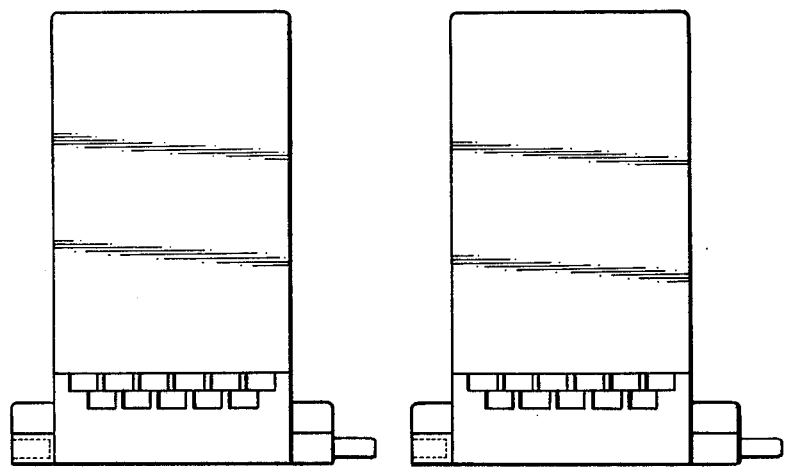
FIGS. 16A and 16B are the front and plan views, respectively of adjoining units and the connector showing a further example of their connective relationship.
Figure 16:
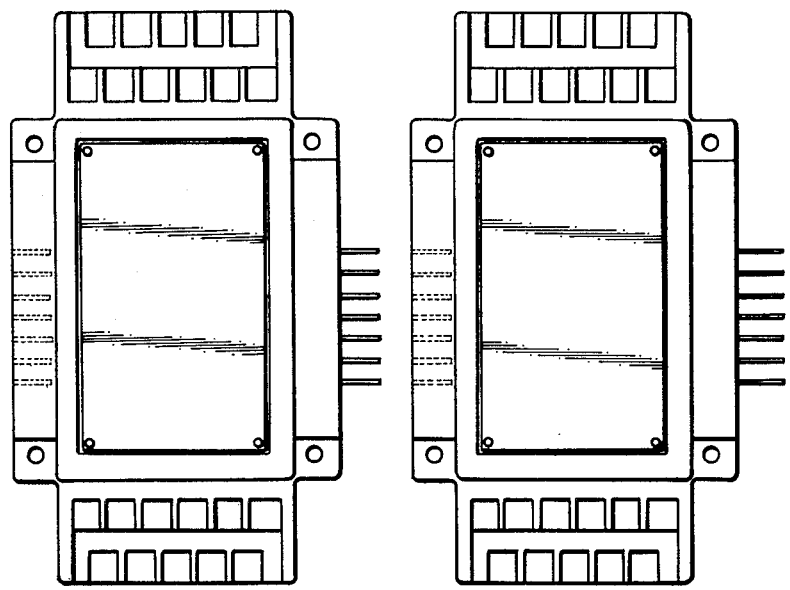
Figure 17B:
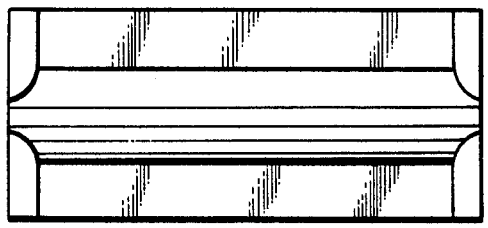
FIGS. 17A, 17B, 17C and 17D are front, plan, bottom and side views, respectively, of a preferred connector unit.
Figure 17A:
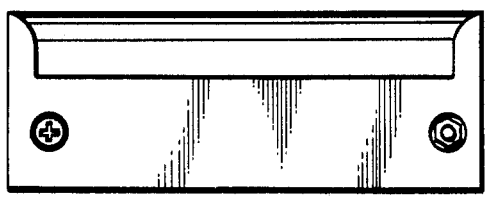
Figure 17D:
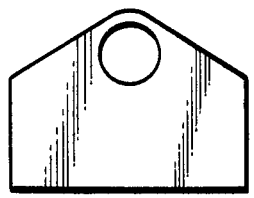
Figure 17C:
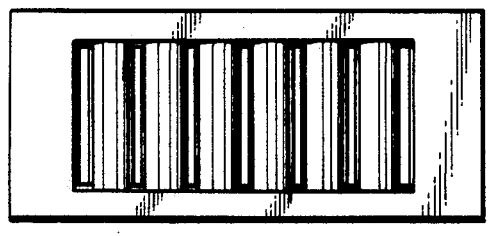

FIGS. 14A, 14B, 15A, 15B, 16A, 16B and FIGS. 17A, B, C, D show the several practical embodiments of the connector means of this invention. FIGS. 18 and 19 show how the connector is applied for connecting the units of this invention. Maintenance, administration, replacement, and location of the trouble spots can be conducted by a non-specialist, and the necessary time and labor required for redesigning when additional motors are desired, can be greatly decreased and furthermore drawings of the sequence design can be simplified.

A pulse conversion circuit 30 which is disposed in either the input circuit portion of the keep relay $KR_1(R)$, or $KR_2(R)$, is employed to minimize the capacity of the direct current voltage of the entire device by converting the wave form of the operation signal, which is the direct-current step voltage, calculated by means of differential calculus.

Additionally a portion or all of entire relays can be replaced by semi-conductor circuits using transistors or thyristers. Mini-integrated solid state circuitry also is suitable for the units.

SECOND EMBODIMENT

This embodiment relates to the sequential control device which is applied to the sequential control of a milling plant which comprises two straight sequential process lines wherein one process line comprises crushing, mixing and storing, and another process line comprises screening, scaling and packing. Such embodiment is described below in conjunction with FIGS. 8, 9 and 10.

Figure 8:
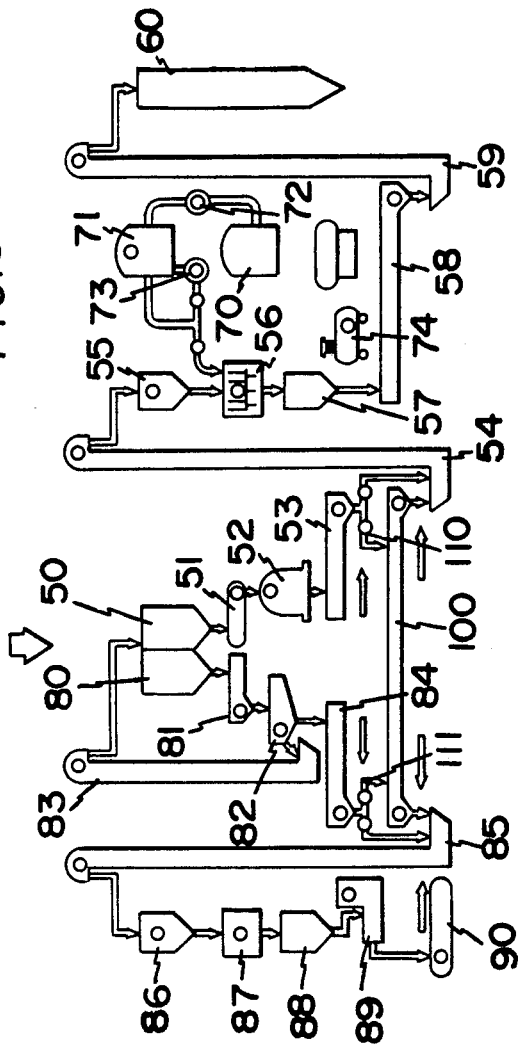
FIG. 8 is a flow chart of the production line of a milling plant.
Figure 9:
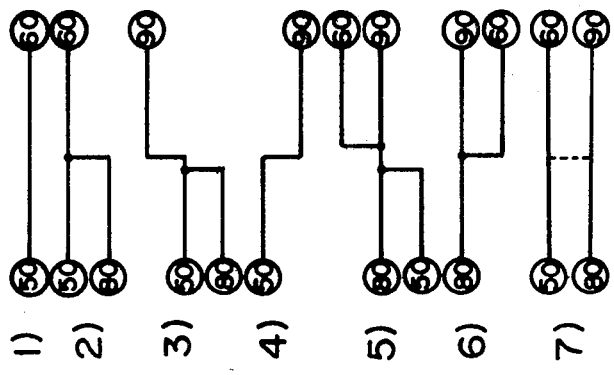
FIG. 9 is a route construction diagram of a production line which is capable of such construction.

FIG. 8 is a flow chart of the process line in the plant wherein the material is processed; FIG. 9 is a route construction diagram of the process line which can be constructed in 7 routes which are described below; and FIG. 10 is a sequential control diagram for the process line of the milling plant.

Referring to FIG. 8, the flow of material to be processed takes place in a plant comprising two straight sequential process lines. With respect to the first process line, the raw material such as corn, which is stored in a tank 50, is conveyed by a belt 51 to a crushing device 52 where such raw material is crushed into granular material or powder. The so-crushed material is then carried by a conveyor 53 to a two-way gate 110. The powder is then discharged into an elevator 54 by way of the right path of the two-way gate 110. The elevator carries the powder to a hopper 55. The material from the hopper 55 is then discharged into a mixer 56 into which an additive, such as syrup, is simultaneously charged by a charging mechanism, such mechanism comprises a syrup storage tank 70, a servicing tank 71, and fluid valves 72 and 73. A compressor 74 supplies compressed air to the fluid valves 72 and 73 for regulating such valves. The mixed material is then discharged into a hopper 57, and transferred by way of a screw conveyor 58 and a bucket elevator 59 to a storage tank 60.

With respect to the second process line, material such as corn with is already processed at least by one operation such as a crushing operation is charged in a hopper 80. The material is conveyed to a screening device 82 by a screw conveyor 81. From the screening device 82, coarse material is charged into an elevator 83 which carries the material back into the hopper 50 while fine material of allowable size range is conveyed to a two-way gate 111 by a screw conveyor 84. The material is then charged into an elevator 85 by way of the left path of the two-way gate 111 which conveys the material into a storage hopper 86. Material is discharged from the hopper 86 into a scaling device 87 where the material is scaled to a determined amount and is charged into a hopper 88. The material which is discharged from the hopper 88 is then packed in a series of bags by means of a packing device 89 wherein each bag is sewn shut after it is full of material. The sewn-shut bags are then transferred to a desired place by a conveyor 90.

Figure 10:
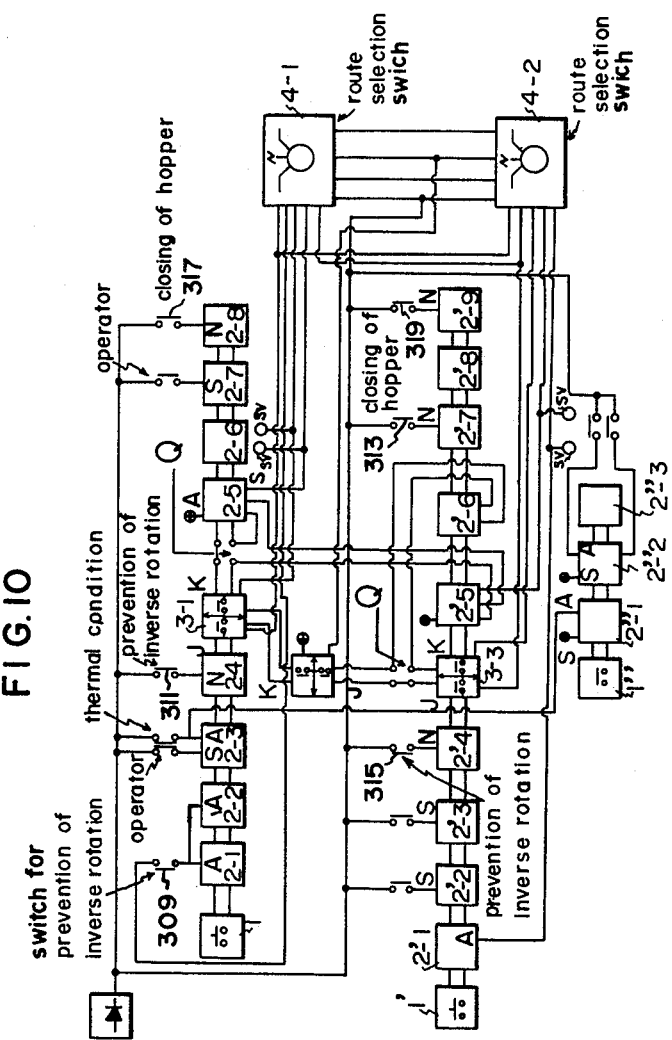
FIG. 10 is a circuit diagram of a sequential control device for the production line of a milling plant.

In the embodiment shown in FIG. 9, seven routes (50→60, 80→90, 50→90, 80→60, 50 80→60, 80 50→90, 50→60 + 80→90) can be constructed by making use of cross units 3-1, 3-2, and 3-3, FIG. 10, wherein routs 80→60, 80 50→60, 80 50→90 are constructed by the cross units 3-1 and 3-2 while the route 80→60 + 50→90 (this implies that routes 80→60 and 50→90 are simultaneously operated) is constructed by the cross unit 33.

The following chart shows the relationship between the drive units in FIG. 10 and the corresponding devices in FIG. 8 which are controlled by the drive units.

| drive unit | device | |
|---|---|---|
| 2 –1 | belt conveyor | 51 |
| 2 –2 | crushing device | 52 |
| 2 –3 | conveyor | 53 |
| 2 –4 | bucket elevator | 54 |
| 2 –5 | hopper | 55 |
| 2 –6 | mixer means | 56 |
| 2 –7 | screw conveyor | 58 |
| 2 –8 | bucket elevator | 59 |
| 2' –1 | screw conveyor | 81 |
| 2' –2 | screening device | 82 |
| 2' –3 | bucket elevator | 83 |
| 2' –4 | screw conveyor | 84 |
| 2' –5 | bucket elevator | 85 |
| 2' –6 | hopper | 86 |
| 2' –7 | scaling device | 87 |
| 2' –8 | packing device | 89 |
| 2' –9 | conveyor | 90 |

Sequential operation of the drive units is programmed such that as shown in FIG. 10, when the sequential operation input is delivered from the master control unit 1, with respect to the route 50→60, the drive units are activated in series (2-1)→(2-2)→(2-4)→(2-5)→(2-6)→(2-8), the drive unit (2-3) being skipped.

With respect to the route 80→90, the drive units are activated in series (2'-1)→(2'-2)→(2'-4)→(2'-5)→(2'-6)→(2'-7)→(2'-8)→(2'-9), the drive unit (2'-3) being skipped.

After the completion of the routes, the conveyor 53 and the elevator 83 are individually checked for any trouble therein. If there is no trouble such devices 53 and 83 are placed into their respective routes by the actuation of the switches S.

In FIG. 10, A indicates the operation condition input, N an inhibition input, S a set input. The sequential control device circuitry is interlocked with the various drive units as shown in the following chart.

| Device | Input of the Drive Unit | Operation of Unit |
|---|---|---|
| Switch 309 for preventing the inverse rotation of BE 59 | Input is given to A terminal of 2-1, 2-2 | 2-1 and 2-2 are stopped. |
| Switch 311 for preventing the inverse rotation of BE 54 | Input is given to N terminal of 2-4 | 2-4, 2-6, 2-7 and 2-8 are stopped. |
| Switch 313 for preventing the inverse rotation of BE83 | Input is given to N terminal of 2'-7 | 2'-7, 2'-8 and 2'-8 are stopped. |
| Switch 315 for preventing the inverse rotation of BE85 | Input is given to N terminal of 2'-4 | 2'-4 2'-6 2'-7 2'-8 2'-9 are stopped. |
| Signal input showing | Input is given to | 2-8 is stopped. |

| Device | Input of the Drive Unit | Operation of Unit |
|---|---|---|
| that the hopper 86 is full. Switch 317 closes. | N terminal of 2-8 | |
| Signal input showing that the hopper 89 is full. Switch 319 closes. | Input is given to N terminal of 2-9' | 2-9 is stopped. |
| Signal input showing that air pressure is decreased in compressor 70 | Input is given to A terminal of 2-3 | 2-3 is stopped. |

In operation of the route arrangement 80-50-60, a sequential stop waiting circuit Q is provided for the purpose of prohibiting trouble in the flow of material in the sequential stop operation. When the input to cause the sequential stop of the motors in the plant is supplied to the units by the master control unit, the conveyor 51 and the conveyor 81 are simultaneously stopped.

Then subsequently the conveyor 53 and the elevator 83 are simultaneously stopped. After the above operation, if a signal from sequential waiting circuit Q is not applied, the elevator 54 and the conveyor 84 are stopped while the conveyor 100 is kept driving, and material still in the conveyor 100 is charged into the inlet opening of the conveyor 54, which is stopped, causing possible mechanical mishap.

For the purpose of preventing such trouble, the sequential waiting circuit Q operates as follows. Due to the activation of the circuit Q, the elevator 54 is kept in operation even when conveyor 84 is stopeed. Then elevator 54 and the conveyor 100 are simultaneously stopped. Subsequently hopper 55, mixer 56, screw conveyor 58, and backet elevator 59 are stopped in sequential order.

As another example, in the arrangement of route 50→90, this arrangement is selected by route selection switches 4-1 and 4-2. The material which is discharged from the tank 50 is conveyed to the belt conveyor 90 by way of the screw conveyor 51 and the belt conveyor 100.

In the diagram, the drive units 2'-1 to 2'4 are first activated in series and then J side of the cross unit 3-3 is switched on, next the B side of cross unit 3-2 is switched on, and then the K side of cross unit 3-1 is switched on and the drive units 2-5 to 2-8 are activated.

It is noted that no electro-magnetic relays are employed in the circuit of the present invention with the exception of one electro-magnetic relay which is used for route selection and the ones which are used in the drive units. A complicated sequential control unit can be achieved according to the invention without employing a sequence which requires electro-magnetic relays, thereby resulting in a drastic decrease in the period required for making the units, as well as increasing the speed of operation thereof in use.

What I claim is:

1. A sequential control device for a number of electric actuating devices such as motors or the like disposed in sequence in at least two manufacturing lines comprising
   (1) master control units (1') and (1") for transmitting control signals ($U_{1'}$) and ($U_{1''}$) respectively,
   (2) drive units ($2_{1'}, 2_{2'} - - - 2_{r'} - - - 2_{n'}$ and $2_{1''}, 2_{2''} - - - 2_{r''} - - - 2_{n''}$) for controlling the operation of the same number of said electric actuating devices ($M_{1'}, M_{2'} - - - M_{r'} - - - M_{n'}$ and $M_{1''}, M_{2''} - - - M_{r''} - - - M_{n''}$), each of said drive units comprising circuit means for controlling the corresponding electric actuating device, and
   (3) cross units (3') and (3") disposed between said first drive units ($2_{r'}$) and ($2_{r'+1}$) and said second drive units ($2_{r''}$) and $2_{r''+1}$) respectively, for changing the manufacturing route, wherein said sequential control signals ($U_{1'}$) and ($U_{1''}$) are transmitted to a head drive unit ($2_{1'}$) and ($2_{1''}$) and then the operation conditions ($V_{1'}$) and ($V_{1''}$) for controlling said actuating devices ($M_{1'}$) and ($M_{1''}$) are transmitted to said corresponding drive units ($2_{1'}$) and ($2_{1''}$) and after the sequential control signals ($U_{2'}$) and ($U_{2''}$) are transmitted to one-step forward units ($2_{2'}$) and ($2_{2''}$) and in this way such sequential control signals ($U_{3'}, U_{4'} - - - U_{r'} - - - U_{n'}$ and $U_{3''}, U_{4''} - - - U_{r''} - - - U_{n''}$) are transmitted in sequence to respective drive units ($2_{3'}, 2_{4'} - - - 2_{r'} - - - 2_{n'}$ and $2_{3''}, 2_{4''} - - - 2_{r''} - - - 2_{n''}$) while said operation conditions ($V_{3'}, V_{4'} - - - V_{r'} - - - V_{n'}$ and $V_{3''}, V_{4''} - - - V_{r''} - - - V_{n''}$) are transmitted to said respective drive units ($2_{3'}, 2_{4'} - - - 2_{r'} - - - 2_{n'}$ and $2_{3''}, 2_{4''} - - - 2_{r''} - - - 2_{n''}$) following said transmission of respective sequential signals ($U_{3'}, U_{4'} - - - U_{r'} - - - U_{n'}$ and $U_{3''}, U_{4''} - - - U_{r''} - - - U_{n''}$), and by the activation of cross units 3' and 3" said sequential control signals are transmitted through said drive units in the following sequences such as ($2_{1'}→2_{2'}→2_{r'} 2_{r''}+1 - - - 2_{n''}$) or $2_{1''}→2_{2''}→2_{r''} - 2_{r'} + 1→2_{n'}$), whereby several processing or manufacturing routes can be made by the application of said sequential control device cross units (3') and (3").

2. A sequential control device according to claim 1, in which said each drive unit comprises a route completion circuit (A), a route check circuit (B), a sequential stop circuit which consists of a transmitting circuit (C) and a return circuit (D), a sequential operation circuit (E), an emergency stop circuit (F), and a manual operation circuit wherein such sequential control signal (U), which comprises a route completion signal (a), a route check signal (b), a sequential stop signal (c) a sequential stop signal (d), a sequential operation signal (e) an emergency stop signal (f) and a manual operation signal (g), are transmitted in sequence through the corresponding circuits (A,B,C,D,E,F, and G).

3. A sequential control device for a plurality of electric actuating devices such as motors disposed in sequence in a manufacturing line, comprising a master control unit having circuit means for transmitting a sequential control signal, and a plurality of drive units ($2_1, 2_2 - - - 2_n$) comprising a head drive unit for controlling the operation of a corresponding number of such electric actuating devices ($M_1, M_2 - - - M_n$) in response to said signal, said drive units each comprising circuit means for controlling the corresponding electric actuating device, said circuit means consisting of a route completion circuit (A), a route check circuit (B), a sequential stop circuit which consists of a transmitting circuit (C) and a return circuit (D), a sequential operation circuit (E), an emergency stop circuit (F) and a manual operation circuit (G), and said sequential control signal comprises a route completion signal (*a*) which passes from the last drive unit to said master control unit along said route completion circuit (A) after being transmitted from said master control unit to the last drive unit along a power supply circuit (H), a route check signal (*b*) which passes from the last drive unit to said master control unit along said route check circuit (B) after being transmitted from said master control unit to the last drive unit along said power supply circuit (H), a sequential signal (c) which reaches the last drive unit in passing through respective drive units along said sequential transmitting circuit (C) and subsequently returns from the last drive unit to said master control unit along said sequential return circuit (D), a sequential operation signal (e) which is transmitted from said master control unit to the last drive unit in passing through respective drive units along said sequential operation circuit (E), an emergency operation signal (f), which is transmitted from said master control unit to the last drive unit in passing through respective drive units along said emergency circuit (F), and a manual operation signal (g) which is transmitted from said master control unit to the last drive unit in passing through respective drive units along said manual operation circuit (G), wherein a sequential control signal is first passed to said head drive unit, and then the operation condition for controlling each actuating device is transmitted to said corresponding drive unit, and after the activation of said drive unit the sequential control signal is transmitted to the next one-step forward drive unit and in this way such sequential control signals are transmitted in sequence to succeeding drive units ($2_3, 2_4 \text{---} 2_n$) following such transmission of respective sequential signals from one drive unit to the next, whereby the sequential operation of all such electric actuating devices is completed.

4. A sequential control device for a number of electric actuating devices such as motors or the like disposed in sequence in at least two manufacturing lines comprising (1) master control units (1′) and (1″) for transmitting sequential control signals ($U_{1'}$) and ($U_{2''}$) respectively, each of said sequential control signals consisting of a route completion signal (a), a route check signal (b), a sequential stop signal (c), a sequential operation signal (e), an emergency stop signal (f) and a manual operation signal (g);

(2) drive units ($2_{1'}, \text{---} 2_{2'} \text{---} 2_{r'} \text{---} 2_{n'}$ and $2_{1''}, 2_{2''} \text{---} 2_{r''} \text{---} 2_{n''}$) for controlling the operation of the same number of said electric actuating devices ($M_{1'}, M_{2'} \text{---} M_{r'} \text{---} M_{n'}$ and $M_{1''}, M_{2''} \text{---} M_{r''} \text{---} M_{n''}$), each of said drive units comprising circuit means for controlling the corresponding electric actuating device, said circuit means comprising a route completion circuit (A) along which said route completion signal (a) returns to said master control unit from the last drive unit after reaching the last drive unit along a power source circuit (H), a route check circuit (B) along which said route check signal (b) returns to said master control unit from the last drive unit after reaching the last drive unit along said power source circuit (H), a sequential stop circuit which comprises a transmitting circuit (C) and a return circuit (D) along which said sequential stop signal (c) passes through, a sequential operation circuit (E) along which said sequential operation signal (e) is transmitted from said master control unit to the last drive unit after passing through respective driving units, an emergency circuit (F) along which said emergency operation signal (f) is transmitted from said master control unit to the last drive unit after passing through respective drive units, and a manual operation circuit (G) along which said manual operation signal (g) is transmitted from said master control unit to the last drive unit after passing through respective drive units;

(3) cross units (3′) and (3″) disposed between said first drive units ($2_r$) and ($2_r + 1$) and said second drive units ($2_{r'}$) and ($2_{r'} + 1$) respectively, for changing the manufacturing route, wherein said sequential control signals ($U_{1'}$) and ($U_{1''}$) are transmitted to a head drive unit ($2_{1'}$) and $2_{1''}$) and then the operation conditions ($V_{1'}$) and ($V_{1''}$) for controlling said actuating devices ($M_{1'}$) and ($M_{1''}$) are transmitted to said corresponding drive units ($2_{1'}$) and ($2_{1''}$) and after the sequential control signals ($U_{2'}$) and ($U_{2''}$) are transmitted to one-step forward units ($2_{2'}$) and ($2_{2''}$) and in this way such sequential control signals ($U_{3'}, U_{4'} \text{---} U_{r'} \text{---} U_{n'}$ and $U_{3''}, U_{4''} \text{---} U_{r''} \text{---} U_{n''}$) are transmitted in sequence to respective drive units ($2_{3'}, 2_{4'} \text{---} 2_{r'} \text{---} 2_{n'}$ and $2_{3''}, 2_{4''} \text{---} 2_{r''} \text{---} 2_{n''}$) while said operation condition ($V_{3'}, V_{4'} \text{---} V_{r'} \text{---} V_{n'}$ and $V_{3''}, V_{4''} \text{---} V_{r''} \text{---} V_{n''}$) are transmitted to said respective drive units ($2_{3'}, 2_{4'} \text{---} 2_{r'} \text{---} 2_{n'}$ and $2_{3''}, 2_{4''} \text{---} 2_{r''} \text{---} 2_{n''}$) following said transmission of respective sequential signals ($U_{3'}, U_{4'} \text{---} U_{r'} \text{---} U_{n'}$ and $U_{3''}, U_{4''} \text{---} U_{r''} \text{---} U_{n''}$) and by the activation of cross units (3′) and (3″) said sequential control signals are transmitted through said drive units in the following sequences such as ($2_{1'} \rightarrow 2_{2'} \rightarrow 2_{r'} 2_{r''} + 1 \text{---} 2_{n''}$) or ($2_{1'} \rightarrow 2_{2'} \rightarrow 2_{r'} - 2_{r'} + 1 \rightarrow 2_{n'}$), whereby several processing or manufacturing routes can be made by the application of said sequential control device cross units (3′) and 3″).

5. A sequential control device for a plurality of electric actuating devices such as motors disposed in sequence in a manufacturing line, comprising a master control unit having circuit means for transmitting a direct current sequential control signal of constant voltage, and a plurality of interchangeable drive units ($2_1, 2_2, \text{---} 2_n$) comprising a head drive unit for controlling the operation of a corresponding number of such electric actuating devices ($M_1, M_2 \text{---} M_n$) in response to said D.C. signal, said drive units each comprising circuit means including plug and socket connectors for controlling the corresponding electric actuating device as such D.C. sequential control signal is given first to said head drive unit, and then the operation condition for controlling each actuating device is transmitted to said corresponding drive unit, and after the activation of said drive unit the D.C. sequential control signal is transmitted to the next one step forward drive unit and in this way such D.C. sequential control signals are transmitted in sequence to succeeding drive units ($2_2, 2_4 \text{---} 2_n$) following such transmission of respective D.C. sequential signals from one drive unit to the next, whereby the sequential operation of all of such electric actuating devices is completed, each of said drive units comprising a route completion circuit (A), a route check circuit (B), a sequential stop circuit which consists of a transmitting circuit (C) and a return circuit (D), a sequential operation circuit (E), an emergency stop circuit (F) and a manual operation circuit (G), and such sequential control signal comprises a route completion signal (a), a route check signal (b), a sequential stop signal (c), a sequential stop signal (d), a sequential operation signal (e), an emergency stop signal (f), and a manual operation signal (g), that are transmitted in sequence through the corresponding circuits (A, B, C, D, E, F, and G).

6. A sequential control device according to claim 1 wherein said master control units, said drive units and said cross units are all prewired circuit units that are similar in size and essential circuitry.

7. A sequential control device according to claim 1 further comprising quick connection means for connecting said units in series with one another for controlling said electric actuating devices in sequence as commanded by said master control units.

8. A sequential control device according to claim 4, wherein said master control units, said drive units and said cross units are all prewired circuit units that are similar in size and essential circuitry.

9. A sequential control device according to claim 4, further comprising quick connection means for connecting said units in series with one another for controlling said electric actuating devices in sequence as commanded by said master control unit.

10. A sequential control device according to claim 5, wherein said mast control unit and said drive units are all prewired circuit units, said drive units being similar in size and essential circuitry.

11. A sequential control device according to claim 5, further comprising quick connection means for connecting said units in series with one another for controlling said electric actuating devices in sequence as commanded by said master control unit.

* * * * *